United States Patent
Froelich

(10) Patent No.: US 11,104,231 B2
(45) Date of Patent: Aug. 31, 2021

(54) SYSTEM FOR MAINTAINING ACCEPTABLE BATTERY CYCLE LIFE FOR ELECTRIC-POWERED VEHICLES

(71) Applicant: Michael Lynn Froelich, Austin, TX (US)

(72) Inventor: Michael Lynn Froelich, Austin, TX (US)

( * ) Notice: Subject to any disclaimer, the term of this patent is extended or adjusted under 35 U.S.C. 154(b) by 0 days.

(21) Appl. No.: 14/120,039

(22) Filed: Apr. 17, 2014

(65) Prior Publication Data
US 2015/0298573 A1    Oct. 22, 2015

(51) Int. Cl.
| | | |
|---|---|---|
| *B60W 10/08* | (2006.01) | |
| *B60L 3/00* | (2019.01) | |
| *B60L 11/18* | (2006.01) | |
| *B60L 1/08* | (2006.01) | |
| *B60L 1/00* | (2006.01) | |
| *B60L 58/21* | (2019.01) | |
| *B60L 53/14* | (2019.01) | |
| *B60L 50/64* | (2019.01) | |
| *B60L 50/60* | (2019.01) | |
| *B60L 58/16* | (2019.01) | |

(52) U.S. Cl.
CPC ............. *B60L 3/0046* (2013.01); *B60L 1/003* (2013.01); *B60L 1/08* (2013.01); *B60L 11/1862* (2013.01); *B60L 50/64* (2019.02); *B60L 50/66* (2019.02); *B60L 53/14* (2019.02); *B60L 58/16* (2019.02); *B60L 58/21* (2019.02); *B60L 2240/34* (2013.01); *B60L 2240/547* (2013.01); *B60L 2240/549* (2013.01); *B60L 2240/80* (2013.01); *Y02T 10/70* (2013.01); *Y02T 10/7072* (2013.01); *Y02T 90/14* (2013.01)

(58) Field of Classification Search
CPC ...................................................... B60W 10/08
USPC ............................................................ 701/22
See application file for complete search history.

(56) References Cited

U.S. PATENT DOCUMENTS

| | | | | |
|---|---|---|---|---|
| 3,489,895 A | * | 1/1970 | Hollberg ................. | H01T 19/04 250/324 |
| 3,891,932 A | * | 6/1975 | Conner .................... | G01P 13/00 327/509 |
| 3,970,858 A | * | 7/1976 | Rist ......................... | B60L 11/04 290/14 |
| 3,983,952 A | * | 10/1976 | McKee ....................... | 280/778 |

(Continued)

OTHER PUBLICATIONS

2001 Currie Electric Cruiser Specification Page, /http://web.archive.org/web/20010303193900/http://currietech.com/e-c/ruiser.html (Mar. 3, 2001).*

(Continued)

*Primary Examiner* — Charles A Fox
*Assistant Examiner* — Michael E Butler
(74) *Attorney, Agent, or Firm* — David Lewis

(57) ABSTRACT

The present invention relates to a system for maintaining battery cycle life for battery-powered electric vehicles.
Current battery-powered electric vehicles such as automobiles and trucks suffer from short cycle lifes of their batteries, meaning that these vehicles' batteries will become unusable well before the normal useful life of combustion engine powered vehicles.
Owners of vehicles using my system will enjoy vehicles with acceptable ranges, acquisition and operating costs, yet will enjoy battery lifes as long or as longer than the useful life of combustion engine vehicles.

27 Claims, 3 Drawing Sheets

(56) References Cited

U.S. PATENT DOCUMENTS

| | | | | |
|---|---|---|---|---|
| 4,012,677 | A * | 3/1977 | Rist | B60L 15/20 290/14 |
| 4,489,242 | A * | 12/1984 | Worst | B60L 1/00 123/142.5 E |
| 4,687,983 | A * | 8/1987 | Beyn | H02J 7/1423 320/123 |
| 5,162,720 | A * | 11/1992 | Lambert | H02J 7/0024 307/150 |
| 5,187,423 | A * | 2/1993 | Marton | B60K 1/04 104/34 |
| 5,214,359 | A * | 5/1993 | Herndon | H02H 1/0007 318/434 |
| 6,066,899 | A * | 5/2000 | Rund | H02J 9/06 307/10.7 |
| 6,164,560 | A * | 12/2000 | Lehrke | A01G 25/09 137/355.12 |
| 6,239,508 | B1 * | 5/2001 | Faris | H01M 6/5011 307/10.1 |
| 6,625,539 | B1 * | 9/2003 | Kittell et al. | 701/29.3 |
| 8,838,308 | B2 * | 9/2014 | Meyers | 701/22 |
| 2002/0171429 | A1 * | 11/2002 | Ochiai | G01R 31/3675 324/426 |
| 2007/0090800 | A1 * | 4/2007 | Schulte | 320/122 |
| 2008/0185196 | A1 * | 8/2008 | Artioli | B60K 6/46 180/65.245 |
| 2008/0280192 | A1 * | 11/2008 | Drozdz | B60K 6/28 429/62 |
| 2009/0140698 | A1 * | 6/2009 | Eberhard | H02J 7/045 320/152 |
| 2009/0150015 | A1 * | 6/2009 | Okubo | B60W 30/188 701/22 |
| 2009/0184686 | A1 * | 7/2009 | Owens, Jr. | H02J 7/0031 320/136 |
| 2009/0191452 | A1 * | 7/2009 | Anantharaman | H01M 6/42 429/120 |
| 2009/0206679 | A1 * | 8/2009 | King | B60L 3/0046 307/125 |
| 2010/0030612 | A1 * | 2/2010 | Kim | G01C 21/362 705/7.18 |
| 2010/0045236 | A1 * | 2/2010 | Muraoka | H01M 10/0525 320/118 |
| 2010/0141208 | A1 * | 6/2010 | Deal | H01M 2/204 320/116 |
| 2010/0145562 | A1 * | 6/2010 | Moran | B60K 6/46 701/22 |
| 2010/0291427 | A1 * | 11/2010 | Zhou | B60L 11/14 429/100 |
| 2011/0014501 | A1 * | 1/2011 | Scheucher | B60K 1/04 429/7 |
| 2012/0013180 | A1 * | 1/2012 | Muto | B60L 11/1855 307/9.1 |
| 2012/0049483 | A1 * | 3/2012 | Dodman et al. | 280/281.1 |
| 2012/0082875 | A1 * | 4/2012 | Watanabe | H01M 2/1077 429/71 |
| 2012/0098501 | A1 * | 4/2012 | Paryani | H02J 7/0054 320/156 |
| 2012/0244397 | A1 * | 9/2012 | TenHouten | H01M 2/1005 429/61 |
| 2013/0113424 | A1 | 5/2013 | Froelich | |
| 2013/0116868 | A1 * | 5/2013 | Erko | B60W 10/26 701/22 |
| 2013/0143101 | A1 * | 6/2013 | Nakagawa | B60L 11/1877 429/157 |
| 2013/0221741 | A1 * | 8/2013 | Stanek | B60L 1/003 307/9.1 |
| 2013/0307327 | A1 * | 11/2013 | Auguet | B60K 28/14 307/10.1 |
| 2014/0067233 | A1 * | 3/2014 | Nishida | F02D 41/20 701/103 |
| 2014/0249959 | A1 * | 9/2014 | Ishida | G06Q 30/0282 705/26.61 |
| 2015/0202985 | A1 * | 7/2015 | Le | B60L 11/1877 307/9.1 |
| 2016/0090001 | A1 * | 3/2016 | Nomoto | B60L 1/003 320/109 |
| 2016/0105054 | A1 * | 4/2016 | Horito | H01M 10/425 320/134 |
| 2016/0111908 | A1 * | 4/2016 | Kwark | H02J 7/0054 320/103 |
| 2016/0193926 | A1 * | 7/2016 | Abraham | B60L 3/0023 701/22 |

OTHER PUBLICATIONS

2001 Currie Men's Electric Cruiser, http://web.archive.org/web/20010620031109/http://www.currietech.com/images/cruisermens.jpg6/2 (Jun. 2, 2001).*

* cited by examiner

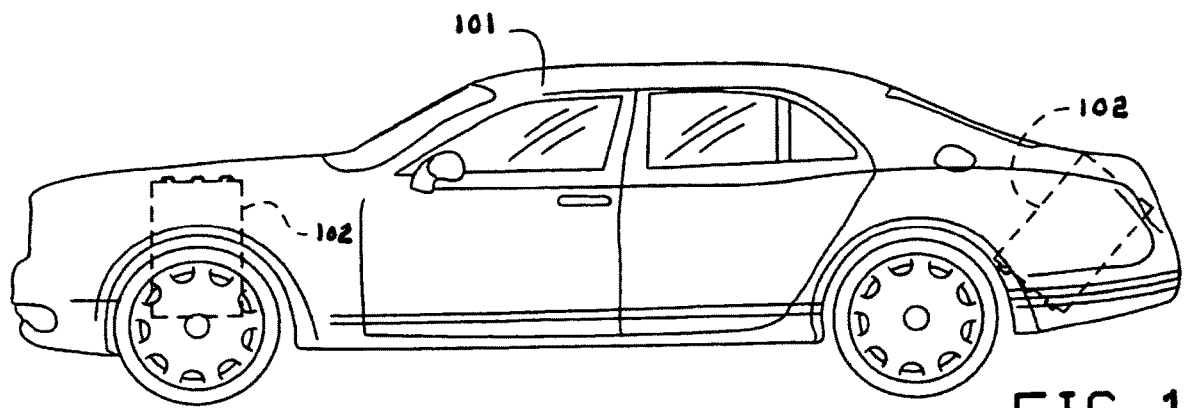
FIG.1
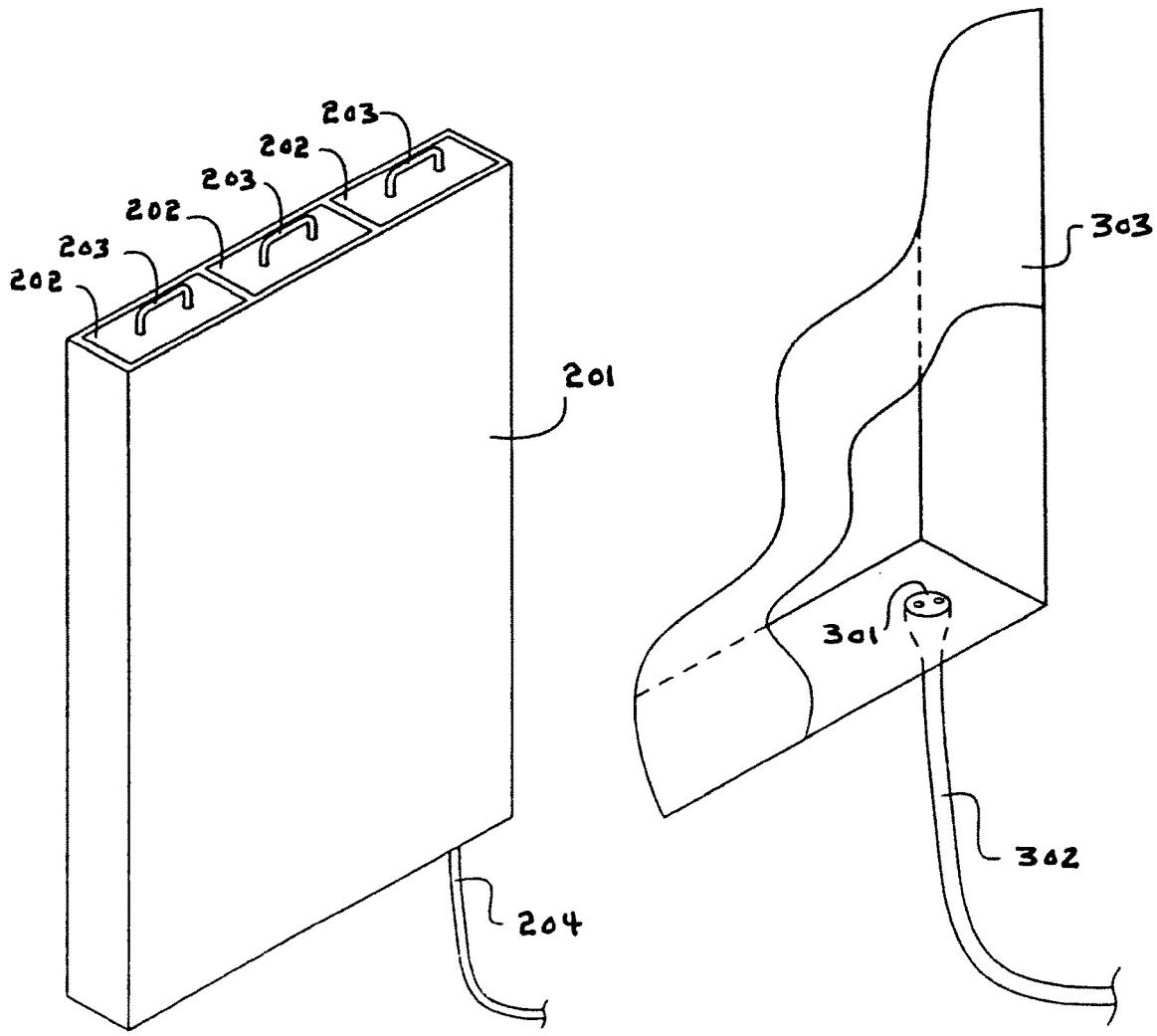
FIG.2
FIG.3

SYSTEM FOR MAINTAINING ACCEPTABLE BATTERY CYCLE LIFE FOR ELECTRIC-POWERED VEHICLES

FIELD OF THE INVENTION

The present invention relates to vehicles or craft of any kind which are powered by batteries with cycle lifes which are diminished by discharging.

BACKGROUND

Current all-electric vehicles are not competitive with their traditional fuel-burning, combustion-engined counterparts because they are designed to encourage their operators to use all or most of the charge of the batteries. All current dry cell, and therefore light weight, rechargeable batteries can only be discharged and recharged, or cycled, a limited number of times before the battery's capacity to accept a charge declines and falls off to an insufficient degree.

All vehicles today use batteries which if discharged by only 15% 5% before recharging can be recharged tens of thousands of times. These same batteries if discharged by 100% can only be recharged between four to six hundred times, meaning only four to six hundred days of operation. Four to six hundred days of vehicle operation is well below the normal duration of use of comunstion combustion engine vehicles, and when owners of current electric vehicles begin to see the charging capacity of their batteries decline after only a few hundred days of use they will regret having purchased such a vehicle with expensive batteries which do not permit their vehicle to last as long as a combustion powered one.

However my system eliminates this problem through several feature and changes. The same batteries will enjoy a cycle life of approximately 5,000 recharges, or 5,000 days of operation, if the batteries are only discharged by 50% each time the vehicle is used.

Discharging the batteries by only 50% will reduce the range of the vehicle by that much using the same batteries, therefore more battery mass must be installed to compensate for the reduced range.

This may be accompanied by using inexpensive batteries as opposed to the very expensive batteries now used by all electric vehicles. Weight is not the limiting factor in designing an electric car with battery cycle life competitive to combustion engine vehicles. The limiting factor for competitiveness is the cost of the batteries such that enough batteries can be installed in the vehicle so that only a fraction of the total charge of the battery is used.

Ideally a vehicle using my invention will have two sets of batteries so that in addition to having acceptable, competitive range due to larger battery mass the vehicle will also be able to operate for longer distances and therefore enjoy even greater competitive range.

SUMMARY OF THE INVENTION

The purpose of the invention is to make all electric, battery-powered vehicles out-compete combustion engine vehicles by increasing the cycle life of the batteries such that they can be operating thousands of days and therefore permit the building of an electric vehicle which can be used for over ten years of daily operation, or for hundreds of thousands of miles of operation, both mileage and age well over that of combustion engines with transmissions.

The electric vehicle has no transmission or combustion engine to wear out, only air conditioning and steering and chassis parts subject to wear. An electric vehicle with my invention will be able to be operated for years and mileage well beyond the capacity of combustion engine vehicles.

As stated above, current battery-powered vehicles possess battery systems which will cause the batteries to only be recharged a few hundred times. Purchasers of current electric vehicles will experience usable lifes and performances of their expensive vehicles which are much less than less-expensive combustion engine cars. This invention solves this problem.

By using a less expensive rechargeable battery, and providing two sets of batteries for the vehicle, sufficient batteries can be installed so that the acceptable range and continuous operation is achieved by switching, or swapping, between the battery sets and utilizing no more than 55% of the batteries' charge when in use.

The claimed invention differs from what currently exists. Whereas current electric vehicles use batteries that are so expensive that they can only install a few of them and therefore their owners must use the entire charge, or at least 85% of the charge, and thereby diminish their usable lifes, my system permits electric vehicle owners to use their vehicles continuously for over a decade without diminishing the capacity of their batteries.

The invention is an improvement on what currently exists. By running down their vehicle's batteries to less than 45% of their charges owners of current electric vehicles can only recharge their batteries only a few hundred times. This means their cars will only be usable for periods less than that of combustion engine cars.

Owners of my vehicles using my system will enjoy acceptable range without using more than 50% of their vehicles' batteries charge, and they may select the amount of discharge they wish to employ in normal, non-reserve conditions. This may be applied to any and all devices using rechargeable batteries such as any type of buses, vans, trucks, automobiles, motorcycles, scooters, boats and ships, aircraft and spacecraft, toys, mobile electronic devices such as computers and telephones, radios and two-way radios, transceivers as only a few examples.

The version of the invention discussed here includes batteries which are inexpensive and encased into removable battery modules which come in two sets per vehicle. While one set is in the vehicle to power it the other set is in an external battery charger where the batteries are assisted in their cycle life preservation by being slowly recharged with a limited current over seven or more hours. To allow the owner to control how much of the batteries in the vehicle are allowed to discharge under normal operation a battery discharge limit indicator is used which is set by the owner between 45% to 60% of battery discharge depending on the range vs. battery cycle life the owner desires. If 50% is selected than the cycle life of the batteries will be between 4,500 and 5,500 recharges. Once the discharge limit indicator is set by the owner it will limit the use of the batteries to the desired point of discharge, and the batteries will not power the drivetrain of the vehicle further unless overridden by an emergency switch allowing the batteries to be used in a reserve mode.

The inexpensive batteries are loaded into the removable battery modules to form a set of batteries, with two sets of batteries per vehicle. The amount of inexpensive batteries comprising a set is sufficient of charge to power the vehicle for a maximum range of at least 200 miles at 50 miles per hour with no braking and using no air conditioning or heating. The battery discharge limit indicator informs the driver how much charge remains until the batteries are discharged to the preset point between 40% to 60% depending on the owner's choice of damage-limitation to the batteries. When the driver has reached the percentage of discharge chosen by the owner the driver changes the set of battery modules, or if unable can over-ride the limiter by using an emergency switch to access the reserve capacity of the batteries.

The invention works in this way. The inexpensive batteries work by permitting a sufficient mass of batteries to be loaded into the vehicle, and to allow for two sets of batteries per vehicle, to permit the vehicles to be manufactured at costs so that the costs to the owner of the vehicle use is equal to or less than combustion engine vehicles. The removable battery modules permit the vehicle to be operated continuously without sitting unusable for the minimum of seven hours charging time required to charge batteries with slow current such that they are not damaged by running high current through them in fast charging times. The external battery charger permits the unused set of battery modules to be recharged while the other set is in use in the vehicle. The battery discharge limit indicator is what permits the owner to set the amount of discharge the batteries will normally endure under non-emergency conditions.

The invention is made by constructing the removable battery modules by fashioning containers into which individual inexpensive battery cells may be placed so that their currents may be conveyed to the vehicle when the removable battery modules are installed in it. The vehicle can be fashioned with an electric motor to propel it and then install the removable battery modules inside it so that the current from the inexpensive battery cells may reach the motor to power it. The battery discharge limit indicator can be fashioned by connecting a sensor measuring the amount of charge remaining on the battery cells to a gauge visible to the driver. Construct an adjustment on the battery discharge limit indicator so the owner may set the amount of discharge permitted under normal conditions, and a switch which can be used by the driver to over-ride the owner's settings under emergency conditions in which the vehicle cannot be brought to the site of the second set of batteries in the external battery charger within the owner's set discharge. The external battery charger can be made by fabricating a housing into which the removable battery modules may be seated so that a current from an outside power source may be conveyed to the individual inexpensive battery cells to recharge them with a current low enough to require at least seven hours to recharge them fully.

To limit damage to the batteries from excessive discharge only inexpensive batteries and the battery discharge limit indicator are required. It is possible to increase the usable life and cycle life of the batteries or cells while keeping them permanently installed in the vehicle and recharge them using an internal recharger which operates on a current low enough to recharge them over at least seven or eight hours.

BRIEF DESCRIPTION OF THE DRAWINGS

Having thus described the invention and it's components, reference will be now be made to the accompanying drawings, which are not necessarily to scale, and wherein:

FIG. 1 shows a vehicle containing battery module housings containing battery modules enclosed within them.

FIG. 2 shows battery modules with handles enclosed within housings from which electric cables run to power the vehicle.

FIG. 3 shows the interior of the battery module housing with its coupling and cable.

Figure 4:
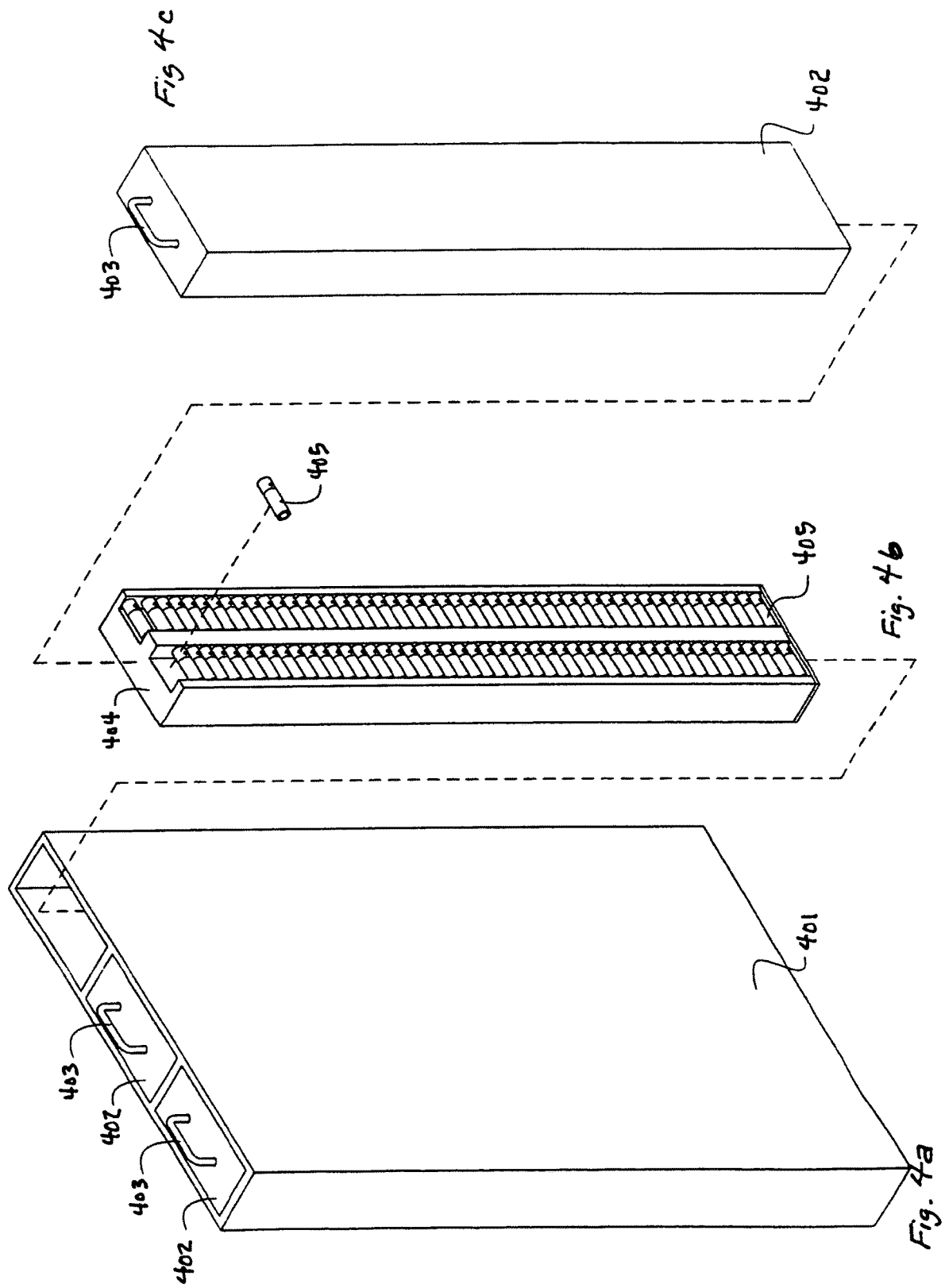

FIG. 4a shows a battery module housing. 4b shows individual battery cells encased within the framework composing the internal structure of the battery module. 4c shows the battery module into which the internal structure is found and which is fitted into the battery module housing when that set of battery modules powers the vehicle.

Figure 5:
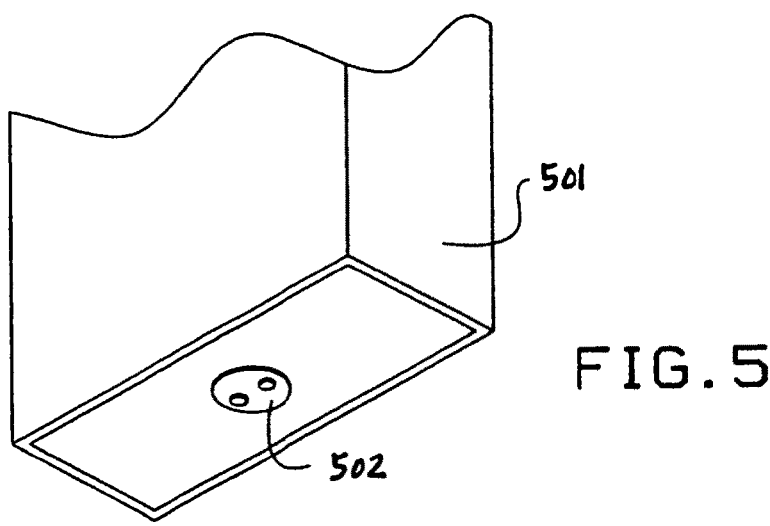

FIG. 5 shows the bottom of the battery module showing the placement of the coupling which connects the battery module and its cells to the circuit powering the vehicle.

Figure 6:
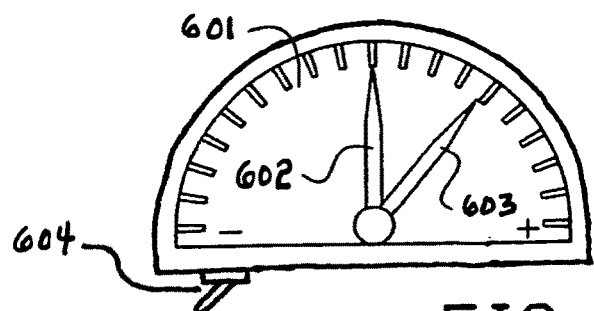

FIG. 6 shows the discharge limit indicator as a needle dial in which one needle is movable by the owner as an adjustment to set the discharge limit while another needle reads the actual charge left on the aggregate of the battery modules in the vehicle at that time, and the over-ride switch permitting the operator to over-ride the discharge limiter and continue using the batteries under emergency conditions.

Figure 7:
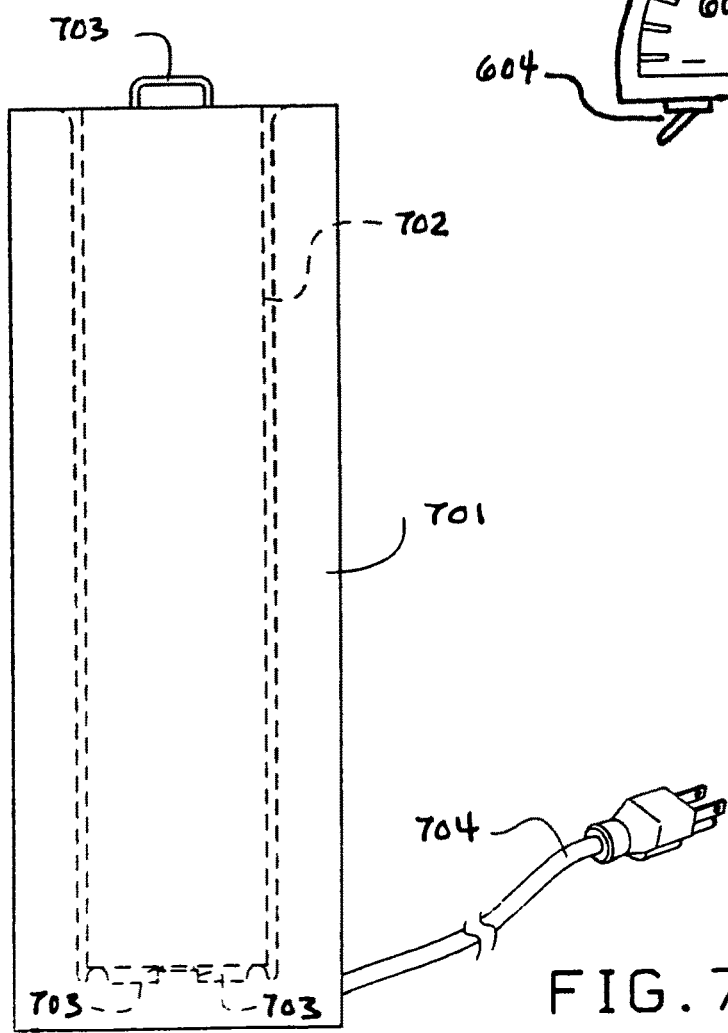

FIG. 7 shows the external battery charger with the placement of an individual battery module within it and the battery charger's cable extending out from it and the battery charger's cable extending out from it to an external power source.

DETAILED DESCRIPTION OF THE INVENTION

The present invention now will be described more fully hereafter with reference to the accompanying drawings, in which some drawings, in which some examples of the embodiments of the inventions are shown, Indeed, these inventions may be embodied in many different forms and should not be constructed as limited to the embodiment set forth herein; rather, these embodiments are provided by way of example so that this disclosure will satisfy applicable legal requirements.

Like numbers refer to like elements throughout.

FIG. 1 Illustrates a vehicle seen from the side loaded with battery modules, with 101 being the vehicle body and 102 being battery module housings into which individual battery modules are placed.

FIG. 2 Is a perspective drawing of three battery modules fitted into a housing residing inside a vehicle, with 201 being the housing body, 202 being the individual battery modules, 203 being the handles by which the battery modules are moved from place to place such as fitted into the housing, and 204 being a connecting electric cable which conveys current from the battery through the housing and outward from the housing to the power requirements of the vehicles, principally the drivetrain.

FIG. 3 Is a cutawary perspective drawing of the interior of the battery module housing in which 301 is a coupling, which connects a battery module to the housing from which current is conveyed outside the housing using a cable 302, and the housing body represented by 303.

FIG. 4a is a perspective drawing of a battery module housing with 401 being the housing body, 402 being the individual battery modules fitted into the body, and 403 being the handles by which the battery modules are moved.

FIG. 4b is the interior structure of the battery module which is found inside of a battery module, in which 404 is the structure framework which holds the individual battery cells and conveys their currents through the battery module via a coupling, and 405 are individual cells.

FIG. 5 is a perspective drawing of the bottom of a battery module 501 and showing the placement of a coupling 502 which conveys current to the framework inside in which resides individual cells.

FIG. 6 Illustrates the discharge limit indicator in the form of a needle dial with a measured dial face 601 so that the vehicle operator can see the amount of charge remaining on the aggregated of the battery modules set installed within the vehicle as a percentage of the total charge capacity of the battery modules' aggregate. 602 represents a movable needle which is the control setting for the discharge limit indicator in which the setting has been set by the vehicle's owner at the mid-point of the aggregate charge of the installed battery module set, or 50% of charging capacity. 603 represents a gauge needle which reads the actual remaining charge left on the aggregate of the battery modules installed in the vehicle, and is reading that the remaining charge is at 75% of total charge capacity. The gauge dial reads left to right with a minus sign on the left of the dial and a positive sign on the right of the dial. 604 represents an over-ride switch which may be used by the vehicle operator so that the battery modules do not automatically disconnect from the drivetrain of the vehicle once their aggregate charge has reached 50% of full charge capacity as indicated by the setting of the movable needle. In this way everything below 50% of full charge is considered a capacity reserve only to be used in emergency conditions so that the cycle life of the batteries will be maintained so that they may be recharged for thousands of times.

FIG. 7 Illustrates the external battery charger into which the set of battery modules which is not presently in the vehicle are placed so that the batteries can be recharged over a minimum of seven or eight hours of low current to preserve the cycle life of the batteries. The external battery charger outside is 701, while 702 is an interior depiction of the placement of an individual battery module with its handle 703 so it may be placed within the charger and removed from it. 703 is a coupling inside the charger which connects to the coupling inside the battery module so current from the outside charger may be conveyed to the battery module and distributed to the individual cells within it. 704 is an electric cable connecting the external battery charger to an outside power source.

Many modifications and other embodiments of the innovation set forth herein will come to mind to one skilled in the art to which these inventions pertain having the benefit of the teachings presented in the foregoing descriptions and the associated drawings. Therefore, it is to be understood that the inventions are not limited to the specific examples of the embodiments disclosed and that modifications and other embodiments are intended to be included within the scope of the appended claims. Although specific terms are employed herein, they are used in a generic and descriptive sense only and not for the purpose of limitation.

The invention claimed is:

1. A system comprising:
    an electric vehicle, the electric vehicle being an all-electric vehicle, the electric vehicle including at least one set of batteries, the at least one set of batteries including one set of batteries that powers the electric vehicle;
    a control system that includes a manual adjustment, as part of the electric vehicle, that adjusts a limit value of an amount that the at least one set of batteries are allowed to discharge to, the limit value being a threshold, such that a discharging of the at least one set of batteries below the threshold, causes the control system to disconnect the at least one set of batteries from powering propulsion of the electric vehicle, and a user display that is operable by the vehicle driver while the vehicle is in operation to manually adjust the limit value at which the batteries are allowed to discharge to, therein adjusting the threshold, which adjusts when the control system disconnects the batteries from powering the propulsion of the electric vehicle and wherein the manual adjustment is controlled by
    a switch that, when manually activated adjusts the limit value of the amount that the at least one set of batteries are allowed to discharge to;
    a plurality of sets of removable battery modules, each set of removable battery modules having one or more removable battery modules, each removable battery module of each set of removable battery modules holds one or more individual batteries which are a power source for the electric vehicle, the plurality of sets of removable battery modules includes at least two sets of removable battery modules, each set of removable battery modules provides enough power to power the electric vehicle therein providing each set of removable battery modules enough power to propel the electric vehicle, each set of removable battery modules having a casing, via which the set of removable battery modules is removable as one unit,
    the at least one set of batteries being batteries stored in one of the plurality of sets of removable battery modules;
    wherein when the vehicle has been operated to the desired discharge limit, the battery modules can be removed and an alternate set installed.

2. The system of claim 1, the electric vehicle further including at least
    an external battery charger that recharges at least one set of the removable battery modules after being removed from the electric vehicle.

3. The system of claim 1, further comprising an internal battery recharger installed within the vehicle, the internal battery recharger being capable of recharging a set of batteries capable of powering the vehicle.

4. A system comprising:
    an all electric vehicle that is propelled by at least an electric motor;
    at least one set of electric battery modules that is currently installed, the at least one set of electric battery modules being removable from the vehicle for recharging, the at least one set of electric battery modules providing electric power to the electric motor while the vehicle is in operation;
    the vehicle including at least a sensor that measures an amount of charge remaining in the at least one set of electric battery modules that powers the electric motor;
    the vehicle further including at least an indicator that indicates the amount of remaining charge measured by the sensor; and
    the vehicle also including at least a control system that includes a manual adjustment that adjusts a limit value of an amount that the at least one set of battery modules is allowed to discharge to, the control system being configured to perform a test for determining when the charge remaining in the at least one set of electric battery modules is lower than the limit value, the control system being configured to disconnect the at least one set of electric battery modules from the electric motor when the amount of remaining charge is lower than the limit value, wherein a vehicle operator can manually adjust the limit value at which the batteries are allowed to discharge to, while the vehicle is in operation;

a first switch that, when manually activated adjusts the limit value of the amount that the at least one set of batteries are allowed to discharge to;

the least one set of battery modules being one of a plurality of sets of removable battery modules, each set of removable battery modules having one or more removable battery modules, each removable battery module of each set of removable battery modules holds one or more individual batteries which are a power source for the electric vehicle, the plurality of sets of removable battery modules includes at least two sets of removable battery modules, each set of removable battery modules provides enough power to power the electric vehicle therein providing each set of removable battery modules enough power to propel the electric vehicle, each set of removable battery modules having a casing, via which the set of removable battery modules is removable as one unit;

wherein when the vehicle has been operated to the desired discharge limit, the battery modules can be removed and an alternate set installed.

5. The system of claim 4, wherein, the limit value is a limit of the value of an amount measured of remaining charge and wherein prior to adjustment, the limit value is set to between 40% and 60% of a full amount of charge of the at least one set of electric battery modules that powers the electric motor.

6. The system of claim 4, wherein, prior to adjustment, the limit value is above 50% of a full amount of charge of the at least one set of electric battery modules that powers the electric motor.

7. The system of claim 4, at least one set of electric battery modules further including a plurality of battery modules placed inside a housing, the housing being fitted inside the vehicle and removable from the vehicle, wherein a handle is attached to each of the plurality of battery modules to facilitate removal of the battery modules from the housing.

8. The system of claim 7, each of the plurality of battery modules further including a plurality of battery cells placed in a frame, the plurality of battery cells being connected in parallel and each of the plurality of battery cells being removable from the frame without removing others of the plurality of batteries.

9. The system of claim 8, each of the plurality of battery modules having at least one column of 50 battery cells, wherein the housing is so dimensioned as to be insertable under a hood of a sedan or inside a trunk of a sedan, and the housing is so dimensioned as to house the at least one column of battery cells.

10. The system of claim 8, of the plurality of battery modules includes a plurality of battery holders rigidly connected to one another to form the rack;

each battery holder of the plurality of battery holders removably holding one battery, so that each battery may be removed without removing any other batteries that are in the battery module from their battery holder.

11. The system of claim 4, further comprising:
a charger that is external to the vehicle, the charger being connected to a power source, wherein the charger recharges at least one set of electric battery modules.

12. The system of claim 4, further comprising:
the at least one set of electric battery modules further including at least one power unit having a plurality of battery modules placed inside a housing, the housing being fitted inside the vehicle and removable from the vehicle, wherein a handle is attached to each of the plurality of battery modules to facilitate removal of the battery modules from the housing;

the manual adjustment being an adjustment operable, via the display, which when manually activated adjusts the limit value of the amount of discharge of the first removable set of battery modules, an override second switch, which when manually activated, causes the at least one set of electric battery modules to be connected to the electric motor even when the amount of remaining charge is lower than the limit value, therein overriding the control system from disconnecting the first removable set of battery modules;

wherein when the vehicle has been operated to the desired discharge limit, a first removable set of battery modules can be removed, and a second removable set of battery modules can be installed as a power source for the electric vehicle to power the electric vehicle;

the sensor measuring an amount of charge remaining in the first removable set of electric battery modules, while the first removable set of electric battery modules powers the electric motor;

the control system being configured to perform a test for determining whether remaining charge is lower than the limit value, the control system being configured to automatically disconnect the first removable set of battery modules from the electric motor when the amount of remaining charge is lower than the limit value;

wherein the control system disconnects the at least one set of electric battery modules from the electric motor when the first marking is lower than the second marking only when the override second switch is not activated;

wherein, prior to adjustment, the limit value is above 50% of a full amount of charge of the at least one set of electric battery modules that powers the electric motor;

a charger that is external to the vehicle, the charger being connected to a power source, wherein the charger recharges at least one set of electric battery modules.

13. The system of claim 4, further comprising an internal recharger being permanently installed within the vehicle.

14. The system of claim 13, the at least one set of batteries including a first set of batteries that powers the vehicle and a second set of batteries that is connected to the internal recharger for recharging while the first set of batteries is connected for operating the vehicle.

15. The system of claim 14, wherein the battery module requires being re-charged slowly over 7 or more hours to avoid damage.

16. The system of claim 4, further comprising a battery recharger and battery module that re-charge slowly over 7 or more hours to avoid damage.

17. The system of claim 4, wherein, prior to adjustment, the limit value is set to 75% of a full amount of charge of the at least one set of electric battery modules that powers the electric motor.

18. The system of claim 4, wherein, prior to adjustment, the limit value is set to 85% of a full amount of charge of the at least one set of electric battery modules that powers the electric motor.

19. A system comprising:
an all electric vehicle that is propelled by at least an electric motor;

the vehicle including at least one set of electric battery modules that is removable from the vehicle for recharging, the at least one set of electric battery modules, alone, providing electric power to the electric motor while the vehicle is in operation;

the vehicle including at least a sensor that measures an amount of charge remaining in the at least one set of electric battery modules that powers the electric motor;

an indicator that indicates the amount of remaining charge measured by the sensor; and the vehicle including a control system that includes a manual adjustment that adjusts a limit value of an amount that the at least one set of battery modules is allowed to discharge to, the control system being configured to perform a test for determining when the remaining charge is lower than the limit value, the control system being configured to automatically disconnect the at least one set of electric battery modules from the electric motor when the amount of remaining charge is lower than the limit value, the control system further including at least a first switch, which when manually activated, causes the at least one set of electric battery modules to be connected to the electric motor even when the amount of remaining charge is lower than the limit value;

a second switch that, when manually activated adjusts the limit value of the amount that the at least one set of batteries are allowed to discharge to;

the at least one set of electric battery modules being one of a plurality of sets of removable battery modules, each set of removable battery modules having one or more removable battery modules, each removable battery module of each set of removable battery modules holds one or more individual batteries which are a power source for the electric vehicle, the plurality of sets of removable battery modules includes at least two sets of removable battery modules, each set of removable battery modules provides enough power to power the electric vehicle therein providing each set of removable battery modules enough power to propel the electric vehicle, each set of removable battery modules having a casing, via which the set of removable battery modules is removable as one unit;

wherein when the vehicle has been operated to the desired discharge limit, the battery modules can be removed and an alternate set installed.

20. The system of claim 19, further comprising a user display that is operable by the vehicle driver while the vehicle is in operation, the user display includes at least a needle dial that has at least:

a dial face with markings indicating remaining charge;

a first needle acting as the indicator, which when pointing to a first marking indicates measured charge remaining in the at least one set of electric battery modules that powers the vehicle;

a second needle acting as the manual adjustment, which is moved manually to adjust the limit value, the limit value being determined by which marking the second needle points to, wherein the control system disconnects the at least one set of electric battery modules from the electric motor when the first marking is lower than the second marking only when the switch is not activated.

21. A method, comprising:

propelling an all electric vehicle by at least an electric motor, the electric motor being powered by at least one set of electric battery modules;

measuring, by at least a sensor that is part of the vehicle, an amount of charge remaining in the at least one set of electric battery modules that powers the electric motor;

indicating, by an indicator that is part of the vehicle, the amount of remaining charge measured by the sensor;

manually setting a manual adjustment that is part of the vehicle to a limit value in a control system;

electronically determining, by the sensor, whether the amount of remaining charge is lower than the limit value that was set manually, and in response to automatically electronically determining, by the sensor, that the amount of remaining charge is lower than the limit value that was set manually, disconnecting, by the control system, the at least one set of electric battery modules from the motor; and wherein the at least one set of electric battery modules are removable from the vehicle for recharging;

the all electric vehicle including at least a switch that, when manually activated adjusts the limit value of the amount that the at least one set of batteries are allowed to discharge to;

a plurality of sets of removable battery modules, each set of removable battery modules having one or more removable battery modules, each removable battery module of each set of removable battery modules holds one or more individual batteries which are a power source for the electric vehicle, the plurality of sets of removable battery modules includes at least two sets of removable battery modules, each set of removable battery modules provides enough power to power the electric vehicle therein providing each set of removable battery modules enough power to propel the electric vehicle, each set of removable battery modules having a casing, via which the set of removable battery modules is removable as one unit;

wherein when the vehicle has been operated to the desired discharge limit, the battery modules can be removed and an alternate set installed.

22. The method of claim 21, further comprising:

setting the manual adjustment to a limit value between 40% and 60% of a full amount of charge of the at least one set of electric battery modules that powers the electric motor.

23. The method of claim 21, further comprising:

manually activating a switch, causing the at least one set of electric battery modules to be connected to the electric motor even when the amount of remaining charge is lower than the limit value, therein overriding the disconnecting, by the control system of the battery from the motor that was in response to the automatically electronically determining, by the sensor, that the amount of remaining charge is lower than the limit value that was set manually.

24. The method of claim 21, further comprising:

removing the at least one set of electric battery modules from the vehicle; and connecting the at least one set of electric battery modules to an external charger that is connected to a power source.

25. The method of claim 24, the at least one set of electric battery modules being a first set of electric battery modules within a first housing;

the removing the at least one set of electric battery modules from the vehicle being performed by at least removing the first housing from the vehicle, therein removing the first set of electric battery modules;

the method further comprising:

connecting a second housing to a cable to the motor of the vehicle, therein electrically connecting a second set of electric battery modules to the motor, the second set of electric battery modules being connected to the motor and providing power source for the motor that is capable of powering the motor, while the first set of electric battery modules are charging.

26. A system comprising:
an electric vehicle, including
at least one set of batteries that powers the electric vehicle; and
a control system that includes a manual adjustment, as part of the electric vehicle, that adjusts a limit value of an amount that the at least one set of batteries are discharged, the limit value being a threshold, such that a discharging of the at least one set of batteries below the threshold, causes the control system to disconnect the at least one set of batteries from the electric vehicle, and a user display that is operable by the vehicle driver while the vehicle is in operation,
the electric vehicle being propelled by at least an electric motor;
the at least one set of batteries including a plurality of batteries; the plurality of batteries being housed within at least a plurality of removable sets of battery modules including at least a first removable set of battery modules and a second removable set of battery modules;
the first removable set of electric battery modules further including a first plurality of battery modules that are placed inside a first housing, the first housing being fitted inside the vehicle and being removable from the vehicle;
each of the first plurality of battery modules having a handle to facilitate removal of the battery modules of the first removable set of battery modules from the first housing;
each of the first plurality of battery modules includes a plurality of battery holders rigidly connected to one another; each battery holder of the plurality of battery holders including a receptacle that removably holds one battery in electrical contact with the battery holder, so that each battery may be removed without removing any other batteries that are in the battery module from their battery holder;
the first removable set of battery modules, when fitted in the electric vehicle and electrically connected to the electric motor, being a power source for the electric vehicle that is capable of entirely powering the electric motor of the electric vehicle,
the second removable set of electric battery modules further including a second plurality of battery modules placed inside a second housing, the second housing being fittable inside the vehicle to replace the first removable set of battery modules and after being fitted into the electric vehicle are removable from the vehicle;
each of the second plurality of battery modules having a handle to facilitate removal of the battery modules of the second plurality of battery modules from the second housing;
each of the second plurality of battery modules includes a plurality of battery holders rigidly connected to one another; each battery holder of the plurality of battery holders including receptacle removably holding one battery in electrical contact with the battery holder, so that each battery may be removed without removing any other batteries that are in the battery module from their battery holder;
the second removable set of battery modules being an alternate power source for the electric vehicle that is capable of entirely powering the electric vehicle and the second removable set of battery modules, after being fitted into the electric vehicle, being removable from the electric vehicle for recharging;
the electric vehicle further including at least
wherein when the vehicle has been operated to a desired discharge limit, the first removable set of battery modules can be removed and the second removable set of battery modules can be installed as a power source for the electric vehicle to power the electric vehicle;
at least a sensor that measures an amount of charge remaining in the first removable set of electric battery modules, while the first removable set of electric battery modules powers the electric motor;
an indicator that indicates the amount of remaining charge measured by the sensor;
the control system includes a manual adjustment that adjusts the limit value;
the control system being configured to perform a test for determining whether remaining charge is lower than the limit value, the control system being configured to automatically disconnect the first removable set of battery modules from the electric motor when the amount of remaining charge is lower than the limit value;
the control system also including at least
a switch, which when manually activated, causes the at least one set of electric battery modules to be connected to the electric motor even when the amount of remaining charge is lower than the limit value, therein overriding the control system from disconnecting the first removable set of battery modules;
a user display that is operable by the vehicle driver while the vehicle is in operation, the user display includes at least a needle dial that has at least:
a dial face with markings indicating remaining charge;
a first needle acting as the indicator, which when pointing to a first marking indicates measured charge remaining in the at least one set of electric battery modules that powers the vehicle;
a second needle acting as the manual adjustment, which when manually moved, points to a second marking that represents the limit value,
wherein the control system disconnects the at least one set of electric battery modules from the electric motor when the first marking is lower than the second marking only when the switch is not activated,
wherein, prior to adjustment, the limit value is above 50% of a full amount of charge of the at least one set of electric battery modules that powers the electric motor;
a charger that is external to the vehicle, the charger being connected to a power source, wherein the charger recharges at least one set of electric battery modules.

27. A system comprising:
an electric vehicle, including
at least one set of batteries that powers the electric vehicle; and
a control system that includes a manual adjustment, as part of the electric vehicle, that adjusts a manual adjustable limit value of an amount that the at least one set of batteries are discharged, the manual adjustable limit value being a threshold, such that a discharging of the at least one set of batteries below the threshold, causes the control system to disconnect the at least one set of batteries from the electric vehicle, and a user display that is operable by the vehicle driver while the vehicle is in operation, the electric vehicle being propelled by at least an electric motor;

the at least one set of batteries including a plurality of batteries; the plurality of batteries being housed within at least a plurality of removable sets of battery modules including at least a first removable set of battery modules and a second removable set of battery modules;

the first removable set of electric battery modules further including a first plurality of battery modules that are placed inside a first housing, the first housing being fitted inside the vehicle and being removable from the vehicle;

each of the first plurality of battery modules having a handle to facilitate removal of the battery modules of the first removable set of battery modules from the first housing;

each of the first plurality of battery modules includes a plurality of battery holders connected to one another; each battery holder of the plurality of battery holders including a receptacle that removably holds one battery in electrical contact with the battery holder, so that each battery may be removed without removing any other batteries that are in the battery module from their battery holder;

the first removable set of battery modules, when fitted in the electric vehicle and electrically connected to the electric motor, being a power source for the electric vehicle that is capable of entirely powering the electric motor of the electric vehicle, the second removable set of electric battery modules further including a second plurality of battery modules placed inside a second housing, the second housing being fittable inside the vehicle to replace the first removable set of battery modules and after being fitted into the electric vehicle are removable from the vehicle;

each of the second plurality of battery modules having a handle to facilitate removal of the battery modules of the second plurality of battery modules from the second housing;

each of the second plurality of battery modules includes a plurality of battery holders connected to one another; each battery holder of the plurality of battery holders including a receptacle removably holding one battery in electrical contact with the battery holder, so that each battery may be removed without removing any other batteries that are in the battery module from their battery holder;

the second removable set of battery modules being an alternate power source for the electric vehicle that is capable of entirely powering the electric vehicle and the second removable set of battery modules, after being fitted into the electric vehicle, being removable from the electric vehicle for recharging;

the electric vehicle further including at least a switch, when manually activated, causes the at least one set of electric battery modules to be connected to the electric motor even when the amount of remaining charge is lower than the manual adjustable limit value, therein overriding the control system from disconnecting the first removable set of battery modules;

wherein when the vehicle has been operated to a desired discharge limit, the first removable set of battery modules can be removed and the second removable set of battery modules can be installed as a power source for the electric vehicle to power the electric vehicle;

at least a sensor that measures an amount of charge remaining in the first removable set of electric battery modules, while the first removable set of electric battery modules powers the electric motor;

an indicator that indicates the amount of remaining charge measured by the sensor;

the control system includes the manual adjustment that adjusts the manual adjustable limit value;

the control system being configured to perform a test for determining whether remaining charge is lower than the manual adjustable limit value, the control system being configured to automatically disconnect the first removable set of battery modules from the electric motor when the amount of remaining charge is lower than the manual adjustable limit value;

the control system also including at least a user display that is operable by the vehicle driver while the vehicle is in operation, the user display includes at least a needle dial that has at least:

a dial face with markings indicating remaining charge;

a first needle acting as the indicator, which when pointing to a first marking indicates measured charge remaining in the at least one set of electric battery modules that powers the vehicle;

a second needle acting as the manual adjustment, which when manually moved, points to a second marking that represents the manual adjustable limit value, wherein the control system disconnects the at least one set of electric battery modules from the electric motor when the first marking is lower than the second marking only when the switch is not activated, wherein, prior to adjustment, the manual adjustable limit value is above 50% of a full amount of charge of the at least one set of electric battery modules that powers the electric motor;

a charger that is external to the vehicle, the charger being connected to a power source, wherein the charger recharges at least one set of electric battery modules.

* * * * *